Dec. 3, 1940. B. L. HENRY Re. 21,645

DOUBLE CHAIN STITCH SEWING MACHINE

Original Filed Oct. 18, 1934 5 Sheets-Sheet 1

INVENTOR
Beulah Louise Henry
BY
Darby & Darby
ATTORNEYS

Dec. 3, 1940. B. L. HENRY Re. 21,645

DOUBLE CHAIN STITCH SEWING MACHINE

Original Filed Oct. 18, 1934 5 Sheets-Sheet 2

Douglas Lawrence Henry INVENTOR

BY

Darby & Darby ATTORNEYS

Dec. 3, 1940. B. L. HENRY Re. 21,645

DOUBLE CHAIN STITCH SEWING MACHINE

Original Filed Oct. 18, 1934 5 Sheets-Sheet 3

INVENTOR
Benjamin Lawrence Henry
BY
Darby & Darby
ATTORNEYS

Dec. 3, 1940. B. L. HENRY Re. 21,645

DOUBLE CHAIN STITCH SEWING MACHINE

Original Filed Oct. 18, 1934 5 Sheets-Sheet 4

Bulah Louis Henry
INVENTOR

BY
Darby & Darby
ATTORNEYS

Dec. 3, 1940. B. L. HENRY Re. 21,645

DOUBLE CHAIN STITCH SEWING MACHINE

Original Filed Oct. 18, 1934 5 Sheets-Sheet 5

INVENTOR
Beulah Louise Henry
BY
Darby & Darby
ATTORNEYS

UNITED STATES PATENT OFFICE 21,645

DOUBLE CHAIN STITCH SEWING MACHINE

Beulah Louise Henry, New York, N. Y.

Original No. 2,037,901, dated April 21, 1936, Serial No. 748,913, October 18, 1934. Application for reissue June 18, 1936, Serial No. 85,919

28 Claims. (Cl. 112—165)

This invention relates to sewing machines and more particularly to a sewing machine provided with mechanism for forming a double chain stitch seam.

The object of the invention is to provide a double chain stitch sewing machine of a novel construction capable of forming a double chain stitch seam which will not ravel easily, and which is adapted to be made both on and off the material.

Features resulting from the attainment of this object include the provision of mechanism wherein rectilinearly reciprocating needles operating alternately in opposite directions produce the double chain stitch formation and novel loop taking and material feeding mechanism whereby it is possible to project loops of a pair of threads at spaced points alternately upwardly and downwardly through the work, and to stretch each such loop to the next succeeding point of projection to be held by the next succeeding loop.

It is a further object of the present invention to provide a double chain stitch seam which will have substantially the same appearance on both sides of the work.

A further object of the invention is to provide a double chain stitch sewing machine comprised of a novel and efficient mechanism which is capable of high speed operation in the formation of a double chain stitch seam.

This object is accomplished according to the present preferred embodiment of the invention by the provision of sewing mechanism, feeding mechanism, and driving mechanism wherein two successive needle holes are formed and feeding of the work occurs twice upon each one rotation of the main driving mechanism.

A further feature is the provision of thread handling instrumentalities which may be located close to the presser foot for normal working, and may easily be moved with the presser foot into a raised position clear of the work and work table.

Further objects of the invention will appear more fully hereinafter.

Referring to the accompanying drawings.

Like numerals of reference in the several figures indicate the same parts.

Figure 1:
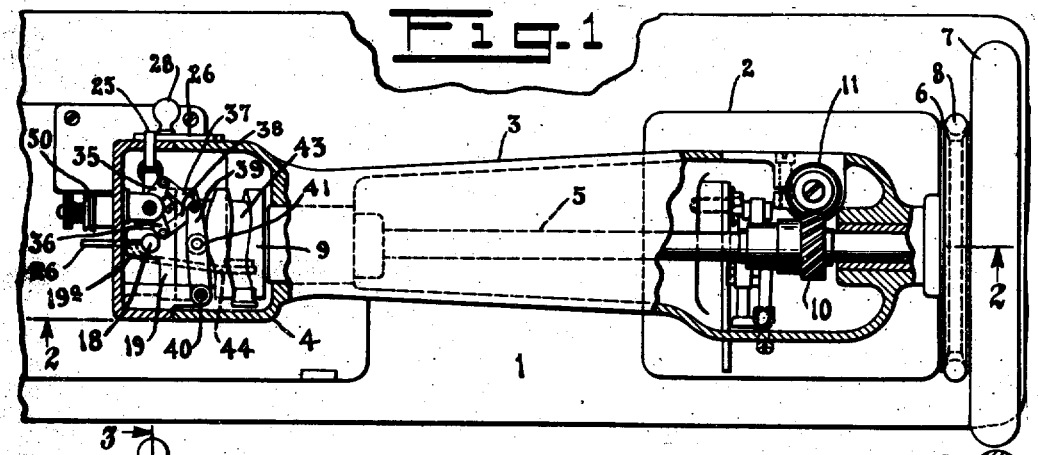
Figure 1 is a top plan view of the machine with parts of the cover broken away so that the interior mechanism may be seen.

The sewing machine of my invention as illustrated in the drawings comprises a bed plate 1 formed with a needle plate 1a and having a casing 2 rising therefrom provided with a laterally extending hollow arm 3 terminating in a head portion 4.

Below the bed plate there is provided the downwardly extending support 57 connected with the hollow casing 56 which encloses certain of the mechanism located at the lower portion of the machine below the bed plate 1.

The hollow arm 3 is provided with suitable bearings for supporting the main drive shaft 5 of the machine. The drive shaft 5 is provided with a driving pulley 6 and the hand wheel 7. The driving pulley and hand wheel may be connected with the drive shaft in any suitable manner and the driving pulley may be driven either by a belt indicated at 8, or by any other suitable or usual driving means.

Figure 2:
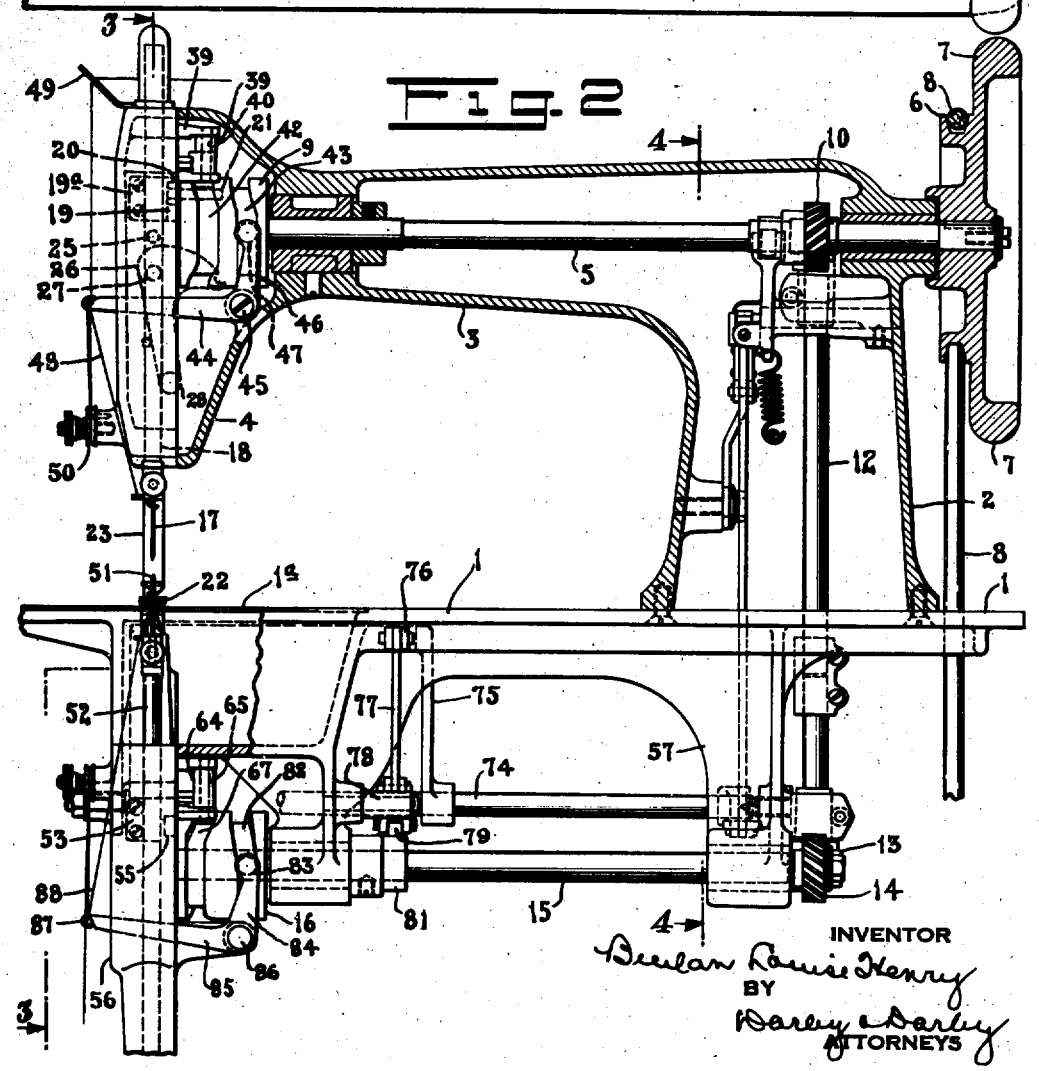
Figure 2 is a side elevational and sectional view of the machine taken on the line 2—2 of Figure 1 and looking in the direction of the arrows.

Referring to Figures 1 and 2, the main drive shaft 5 is shown as provided at its left hand end with the cam member 9. The other end of the main drive shaft has mounted thereon a gear 10 which is positioned so that it will mesh with a gear 11 mounted on the upper end of a vertical shaft 12. The shaft 12 at its lower end is provided with a gear 13 (see Figure 4) which is positioned so that it will mesh with a gear 14 secured to the right hand end of horizontal shaft 15 located at the lower portion of the machine. The left hand end of shaft 15 has mounted thereon a cam member 16 which is identical in size and construction with the upper cam member 9 which is secured to the main drive shaft 5.

It will be evident from the above description of the arrangement of the several shafts that when a rotary movement is imparted to the main drive shaft 5 said shaft through its gear 10 will impart a similar rotary movement to the lower horizontal shaft 15 through the vertical shaft 12.

The double chain stitch machine of the present invention employs an upper and lower needle which are caused to have an alternately rectilinearly reciprocating movement in timed relation with each other in effecting the formation of the double chain stitch. The mechanism for effecting the movements of the upper needle and its associated and cooperating parts will now be described.

The upper needle is indicated at 17 and is secured by usual means to a needle bar 18. The needle bar is reciprocally mounted in the head portion 4 and has a reciprocal movement imparted to it by the following described mechanism.

Figure 7:
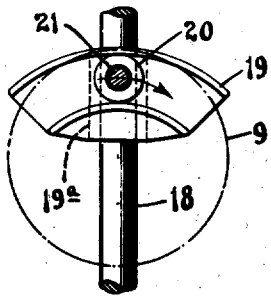
Figures 7, 8 and 9 are detail views taken along the line 7—7 of Figure 5 looking in the direction of the arrows.
Figure 8:
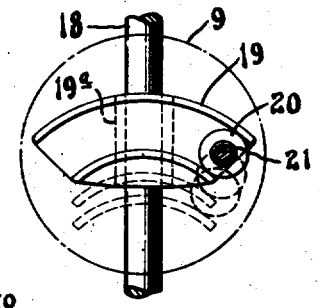
Figure 9:
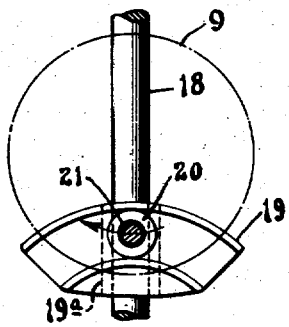
Figure 10:
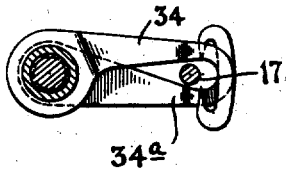
Figure 10 is a detail plan view of the upper loop hooks forming part of the mechanism of the machine and showing said hooks in their closed position with respect to the needle.
Figure 11:
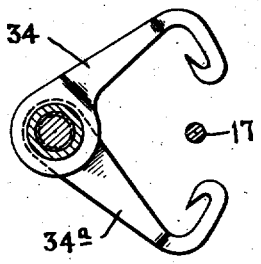
Figure 11 is a view similar to Figure 10 but indicating said loop hooks in open position.

Clamped to the needle bar by means of a yoke member 19a is a curved follower 19 (see Figures 5, 7, 8 and 9). The curved follower is engaged by a roller 20 which is rotatably mounted in the end portion of the cam member 9 by means of a pin 21. When the main drive shaft 5 and cam member 9 are caused to be rotated the roller 20 engaging in the curved follower 19 will cause the needle bar 18 to have an up and down reciprocating motion imparted to it. The manner in which the reciprocating motion is imparted to the needle bar is clearly indicated in Figures 7, 8 and 9. Referring to Figure 7 it will be seen that the roller 20 is shown at the time when the needle bar is in its highest raised position. As the shaft 5 and the cam member 9 are rotated in the direction indicated by the arrow in Figure 7 the roller 20 moves downwardly in the curved follower and forces the needle bar downwardly as indicated in Figure 8. As the shaft 5 and cam member continue to rotate, said roller retraces its movement in said follower and thus continues to force the needle bar downwardly until the said roller reaches the position in the follower indicated in Figure 9. The continued rotation of shaft 5 and cam member 9 and the retracing movement of the roller in the follower causes said roller to push the needle bar upwardly until it reaches its original raised position as indicated in Figure 7.

Figure 3:
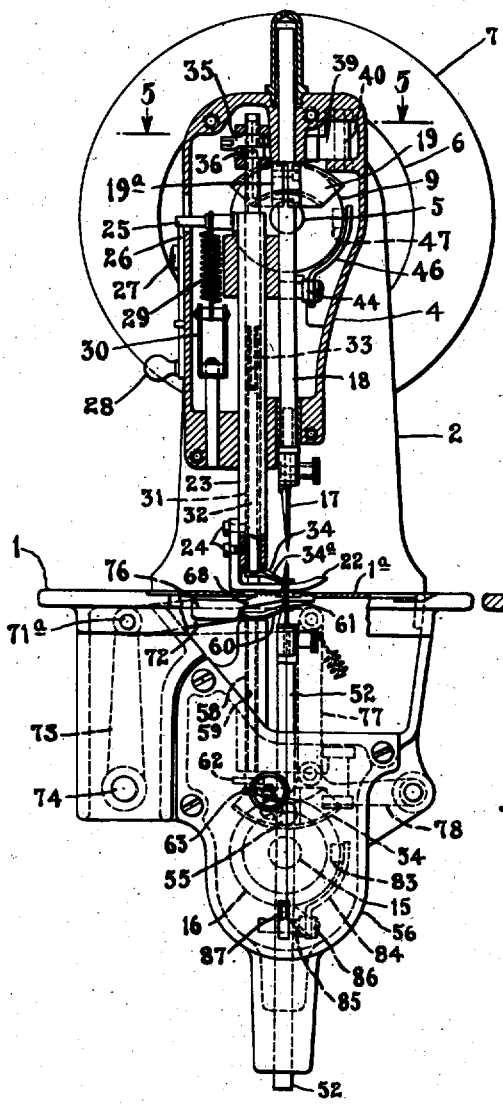
Figure 3 is a sectional view taken on the line 3—3 of Figure 2 looking in the direction of the arrows.

Reciprocally mounted in suitable bearings in the head portion 4 of the machine is a hollow presser foot bar 23 provided with the usual type of presser foot device 22 secured at the lower end thereof by means of the screw bolts 24. The presser foot bar at its upper end has secured thereto an outwardly extending pin 25. The pin 25 extends through the side of the head portion 4 and its end is positioned so that it will engage with a cam member 26 rotatably secured to the head portion as at 27 and which is adapted to be rotated by means of the handle 28. When the cam member is rotated the pin 25 rides over the cam surface of the cam member and causes said presser foot bar to be raised and lowered out of and into operative position with respect to the needle plate 1a. The presser foot bar is normally held in its lowered operative position by means of the spring 29 which has one end secured to the pin 25 and the other end secured to any suitable means, such as is indicated at 30 in Figure 3.

Rotatably mounted in the presser foot bar is a hollow sleeve 31 which encloses a rotatable solid shaft 32. The sleeve 31 and shaft 32 are rotatively supported at their upper ends in suitable bearings in the upper part of the head portion 4. The sleeve 31 is formed with a sliding joint indicated at 33 and which is so positioned that it will permit the presser foot bar to be shifted up and down and to raise and lower the lower end of said sleeve. The solid shaft 32 is also provided with a sliding joint so that the lower end thereof may be shifted up and down with the presser foot bar.

Fixedly secured to the lower end of the hollow sleeve 31 is one upper loop hook 34 of the machine. Secured to the lower end of solid shaft 32 is the second upper loop hook 34a.

At the upper ends of sleeve 31 and shaft 32 there is clamped thereto the forked levers 35 and 36. The levers 35 and 36 are connected to a lever 39 by means of the links 37 and 38. Lever 39 is pivotally mounted by means of a pin 40 between two lugs in the head portion 4 of the machine and is provided with a roller 41 which is positioned so that it engages in the cam race 42 formed in the cam member 9. The cam race 42 is so formed that when the cam member 9 is rotated by the drive shaft 5 it will impart to lever 39 such a movement that said lever through links 37 and 38 will move levers 35 and 36 and impart timed rotative movements to sleeve 31 and shaft 32 so that the loop hooks 34 and 34a will be caused to be opened and closed with respect to each other.

The cam member 9 is also formed with a cam race 43. Cam race 43 is provided to effect the operation of the thread takeup arm 44. The takeup arm is pivotally mounted to the casing as indicated at 45 and has the roller 47 rotatively mounted in one end thereof. The roller 47 is positioned so that it rides in the cam race 43. The other end of the takeup arm is provided with a guide hook for engaging with the thread 48 fed to the needle 17. The thread 48 is fed through the guide 49 (see Figure 2) around tension device 50 and through eyelet in end of lever 44 and thence to the needle. The cam race 43 is so formed that when the cam member 9 is rotated said cam race will impart a timed rocking motion to the thread takeup arm 44 and the thread will thus be fed to the needle at timed intervals.

The mechanism effecting the movements of the lower needle of the machine and its associated and cooperating devices will now be described.

The mechanism employed for imparting the up and down reciprocation of the lower needle is identical with that employed for operating the upper needle. The lower needle is designated 51 and it is suitably mounted at the upper end of the needle bar 52. The needle bar 52 is reciprocally mounted in suitable bearings in the lower casing. Clamped to the needle bar by means of the yoke member 53, in the same manner as was the case in connection with the upper needle bar 18, is the curved follower 54 (see Figure 3). Said curved follower is engaged by the roller 55 which is rotatably secured to the end portion of the cam member 16 by means of a pin similar to the manner in which the roller 20 is secured to cam member 9. When shaft 15 and cam member 16 are rotated, the roller 55 which is engaged in said follower will effect an up and down reciprocation of the needle bar 52 in the same manner as the upper needle bar 18 is reciprocated as above described.

In the casing 56 of the lower portion of the machine there is rotatably mounted in suitable bearings the hollow sleeve 58 which encloses the rotatably mounted solid shaft 59. Fixedly secured to the upper end of the sleeve 58 is one prong 60 of the lower loop hooks of the machine. Fixedly secured to the upper end of solid shaft 59 is the other prong 61 of the lower loop hooks. The lower ends of sleeve 58 and shaft 59 have clamped thereto forked levers 62 and 63 which are identical in character with the levers 35 and 36 connected to the upper sleeve 31 and shaft 32. Links (not shown) but similar in construction and arrangement to the links 37 and 38 connect the levers 62 and 63 with a lever 64. Lever 64 is pivotally mounted at one end in the framework of the lower casing by means of the pin 65 and is also provided with a roller positioned so that it will cooperate in the cam race 67 of the cam member 16. Cam race 67 is so formed that the rotation of the cam head by shaft 15 will cause lever 64 through said links and forked levers 62 and 63 to impart a rotative movement to sleeve 58 and shaft 59 at timed intervals so that the loop hooks 60 and 61 will open and close.

The lower look hooks 60 and 61 are mounted in a fixed position with respect to the underside of the needle plate 1a and are not moved towards and from said needle plate as is the case with respect to the upper loop hooks which are secured to the sleeve and solid shaft mounted in the presser foot bar.

Figure 6:
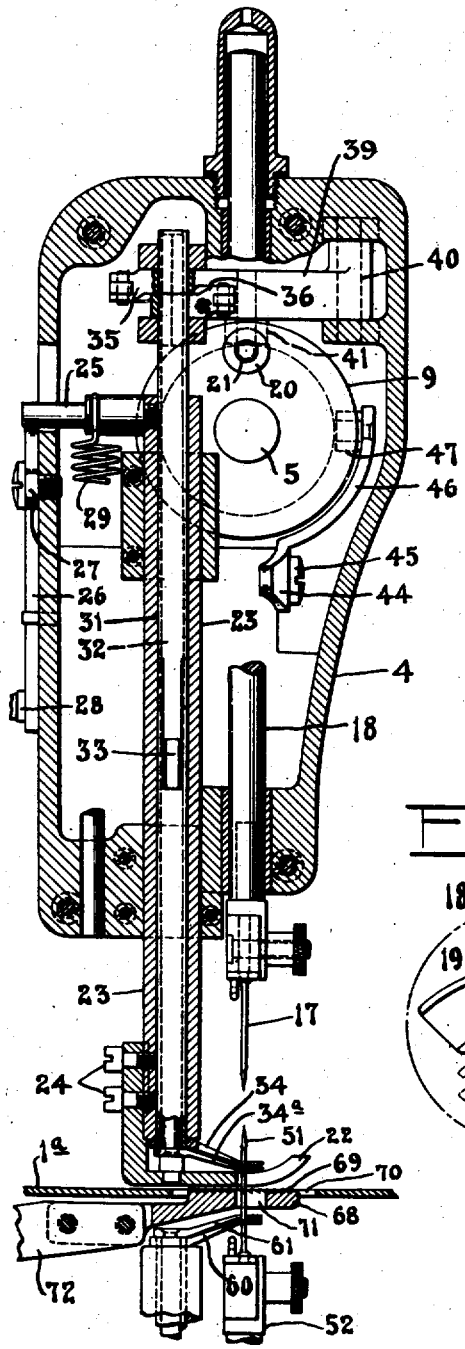
Figure 6 is an enlarged sectional view of the upper portion of the machine, taken on the line 6—6 of Figure 5 looking in the direction of the arrows.
Figure 5:
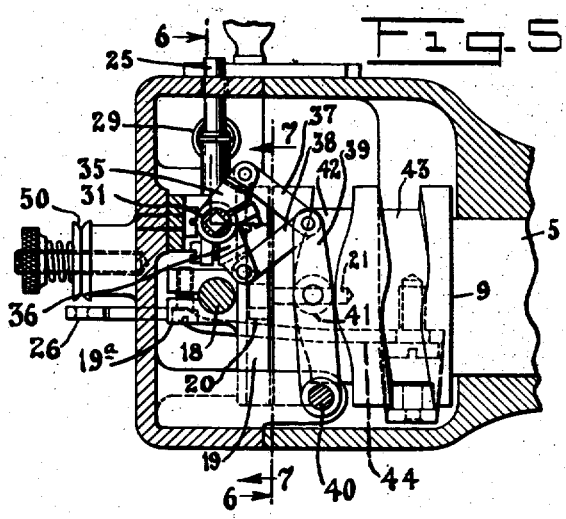
Figure 5 is a sectional view taken on the line 5—5 of Figure 3.

In the mechanism positioned below the needle plate 1a, in place of a presser foot, there is provided a fabric feeding claw 68. The feeding claw is formed with a serrated edge portion 69 (see Figure 6) which is positioned in the opening 70 in the needle plate. The feeding claw is provided with an opening 71 therein through which the needles 51 and 17 are adapted to pass as they are reciprocated up and down by the above described mechanism. The feeding claw is secured to a lever 72 which is fixedly secured to a shaft 71a. The shaft 71a is secured at one end to the arm 73 which in turn is secured to a shaft 74. When an oscillating movement is imparted to shaft 74 it will be seen that the lever 73 will impart a back and forth swinging movement to the shaft 71a thereby reciprocating lever 72 and thus the feeding claw 68 will be caused to be moved back and forth in the opening 70 in the needle plate 1a and the fabric being stitched will thus be progressed along the surface of the said needle plate.

Mechanism is also provided for imparting an up and down movement to the feeding claw so that it will grip and release the underside of the fabric during its feeding movement of the same. The mechanism provided for the above mentioned purpose is as follows:

Extending from shaft 71a, to which the feeding claw 68 is secured, is an arm 76 (see Figure 2). The arm 76 is pivotally secured to a link 77 which in turn is pivotally secured to a lever 78. One end of lever 78 is provided with a roller 79 and the other end is pivotally secured to the framework of the lower casing of the machine. Roller 79 is positioned so that it will register and cooperate with a cam 81 mounted on the shaft 15. When shaft 15 is rotated the cam 81 and roller 79 cause lever 78 to be rocked, and lever 78 through lever 77 and arm 76 imparts a rocking motion to shafts 71a and thus effects a raising and lowering of the feeding claw 68.

The movements of the mechanism above described for effecting the operation of the feeding claw are so timed that the upward movement of the feeding claw for making contact with the fabric is effected immediately before said claw starts its forward movement; it starts downward on completion of the forward stroke effecting the disengagement of the claw from said fabric.

The lower cam member 16 is also provided with a second cam race 82. Cooperating with cam race 82 is a roller 83 pivotally mounted at the end of an arm 84 of a thread takeup lever 85. The thread takeup lever 85 is pivotally mounted by means of the pin 86 to the framework of the lower casing of the machine and at its other end 87 it is provided with a curved slot to receive the thread 88 which is fed to the lower needle 51. When the cam member 16 is rotated by means of shaft 15, the cam race 82 causes roller 83 to impart a rocking motion to the thread takeup lever 85 and to cause said lever to effect the feeding of the thread to said needle at timed intervals and in timed relation with the operation of the other parts of the mechanism associated with the lower needle. The mechanism for feeding the thread to the lower needle 51 is identical with and is operated identically in the same manner as the mechanism for feeding the thread to the upper needle 17.

The means for imparting rotative movements to shaft 74 will now be described.

Figure 4:
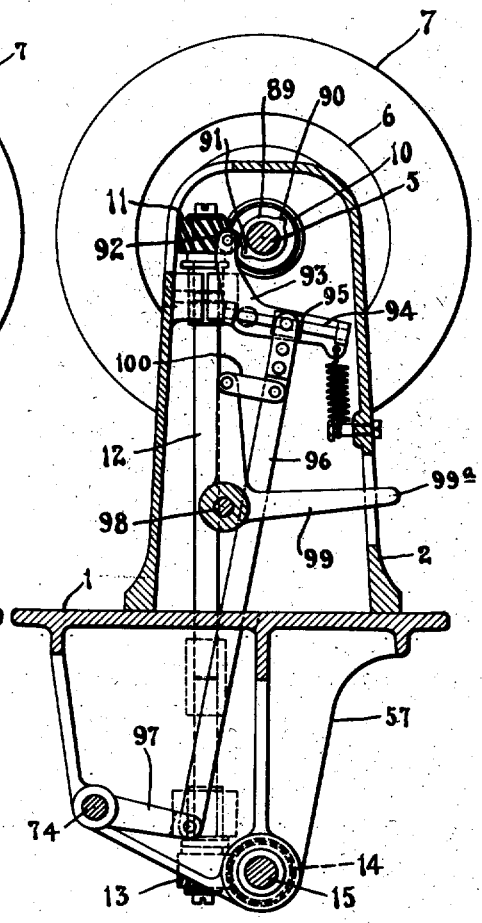
Figure 4 is a sectional view taken on the line 4—4 of Figure 2 and looking in the direction of the arrows.

Referring to Figure 4, it will be noted that a cam 89 is mounted on the main drive shaft 5, said cam being provided with lobes 90 and 91. Cooperating with said cam is a roller 92 which is rotatively mounted at the end of the curved lever 93. Secured in outstanding lugs on the side face of the arm 93 is a rod 94. Slidably mounted on said rod is a sliding block 95 which is secured to the upper end of a rod 96. Rod 96 is pivotally secured at its lower end to the link 97 which in turn is secured to shaft 74. It will be apparent that when the drive shaft 5 is rotated the lobes 90 and 91 on cam 89 will cause lever 93 to be rocked and through the connecting rod 96 and arm 97 the shaft 74 will have imparted thereto periodic oscillating movements. The shaft 74 by reason of its operation by the mechanism above referred to will in turn effect the back and forward movements of the feeding claw in the opening provided in the needle plate 1a and thus the fabric being worked upon will be fed along said needle plate. By reason of the two lobes 90 and 91 on cam 89 there will be provided two feeding movements to the feeding claw for each revolution of the drive shaft 5 and consequently the movements of the material through the machine will be twice as fast as is the case in the ordinary sewing machine.

Again referring to Figure 4, it will be noted that a lever 99 is provided which is pivotally secured to the framework 2 of the machine, as at 98. One end 99a of lever 99 extends through the casing and the other end is secured to a link 100. The other end of link 100 is pivotally connected to connecting rod 96. By raising or lowering the end 99a, the rod 96 and its sliding block 95 may be positioned with respect to the rod 94 mounted on lever 93. By adjusting the position of the sliding block 95 with respect to rod 94 variations in the length of the feeding stroke of the feeding claw 68 may be effected and a different length of stitch may be accomplished by the operation of the machine.

The manner in which the operation of the needles and the other mechanism of the machine effect the formation of a stitch will now be explained.

Figure 12:
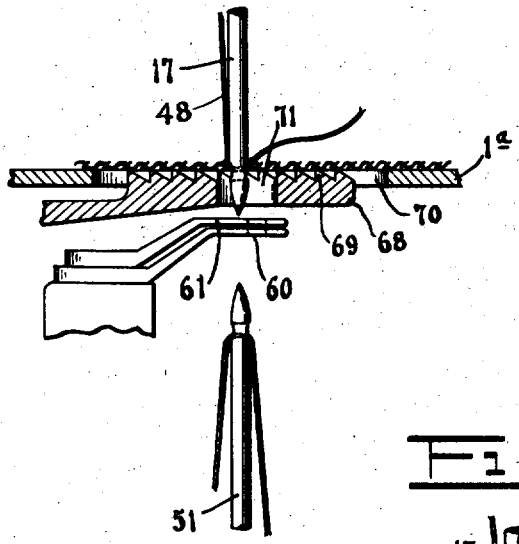
Figure 12 is a detail sectional view showing the positions of the upper and lower needles of the machine at the start of their reciprocating movements in forming the double chain stitch.
Figure 13:
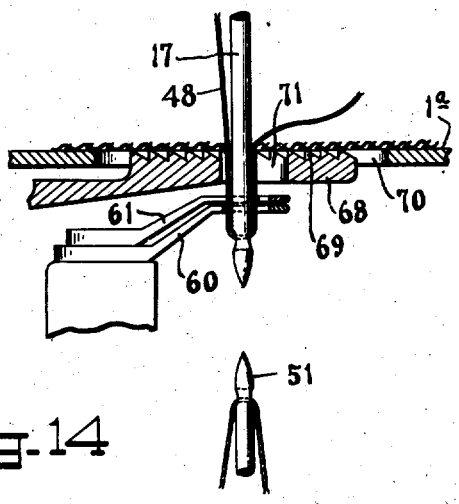
Figure 13 is a view similar to Figure 12 but showing the upper needle in a more advanced descending position.
Figure 14:
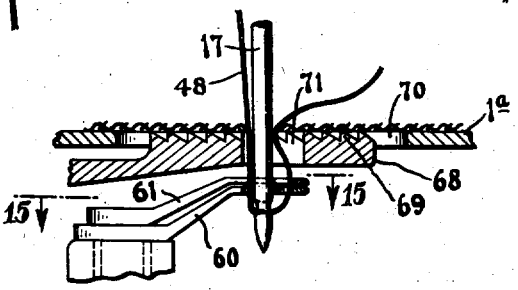
Figure 14 is a view similar to Figure 13 showing the upper needle as it has completed its descending and is beginning its upward movement and the lower loop hooks as they are starting their opening movement.
Figure 15:
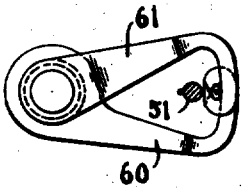
Figure 15 is a plan view of the loop hooks as they appear in Figure 14, said view being taken on the line 15—15 of Figure 14, looking in the direction of the arrows.
Figure 16:
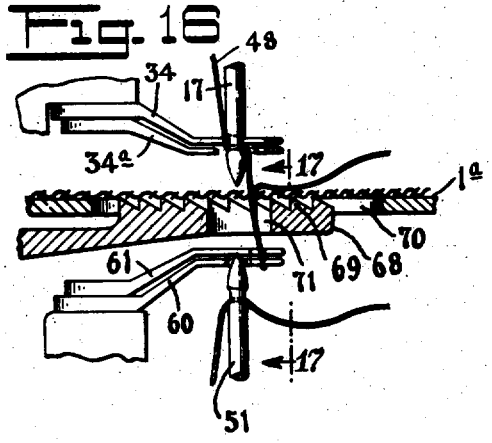
Figure 16 is a view showing the next step in the formation of the double chain stitch and at the time when the upper needle has started to withdraw upwardly from the work and the lower needle has commenced to move upwardly.
Figure 18:
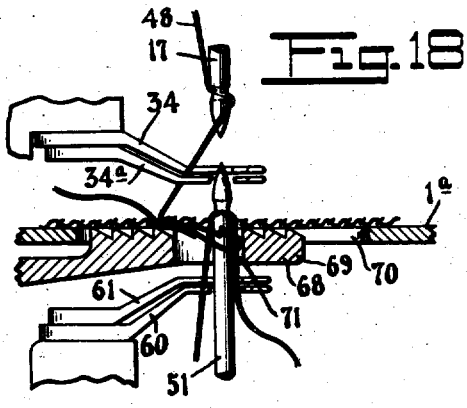
Figure 18 is a view showing the next step in the formation of the double chain stitch and indicating the lower needle further advanced upwardly and the upper needle at the time it has about completed its upward movement.
Figure 17:
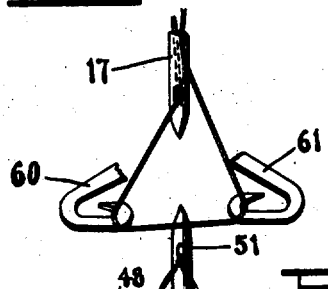
Figure 17 is a view of the lower loop hooks taken on the line 17—17 of Figure 16 looking in the direction of the arrows, said hooks being shown in perspective in wide open position.

Referring to Figure 12, it will be see that when the upper needle 17, with its thread 48, is operated so that a downward movement is imparted thereto by the needle bar 18, it is caused to pierce the fabric and to pass through the opening 71 in the feeding claw. As the needle continues on its downward movement (see Figure 13) is passes, with its thread, between the lower loop hooks 60 and 61 which up to this point are maintained in their closed position. As the needle 17 reaches the position indicated in Figure 13 the mechanism which controls the opening and closing of the lower loop hooks causes said hooks to start their opening movement and to grasp the thread held by the upper needle and to spread the same so as to form a loop. This relation of the loop hooks, upper needle and the thread, is clearly indicated in Figure 14. Referring to this figure it will be seen that at this point of the operation the needle 17 has started slightly in the direction of its upward movement and there is produced in a loop form a slight slack in the thread and the loop hooks hold the thread in a partially spread condition. In Figures 16 and 17 the upper needle 17 is shown as it has withdrawn further in its upward movement. The lower loop hooks 60 and 61 are shown as having completed their outward movement and are holding the thread which they have grasped from the upper needle in an extended spread condition. At this point, the mechanism which effects the operation of the lower needle 51 has caused said needle to start its upward movement. In Figure 18 the upper needle is shown as having completed its upward movement and the lower needle has been advanced upwardly through the lower loop hooks and the loop held on said hooks. As the lower needle advances upwardly it is to be understood that the mechanism operating the lower loop hooks has caused said hooks to close and to release the loop which they have previously held in extended form. This loop now is drawn tight against the fabric by the take-up arm 44. In Figure 18 the lower needle is also shown as having advanced upwardly through the opening in the feeding claw and has pierced the fabric. It will be noted also that as the lower needle starts its upward movement and the upper needle has left the fabric the mechanism of the machine which effects the operation of the feeding claw has caused said feeding claw to advance the fabric towards the left so that when the lower needle passes through the loop formed of the upper thread and held by the lower loop hooks, the new loop formed by the lower needle will pierce the fabric in advance of the preceding loop.

Figure 19:
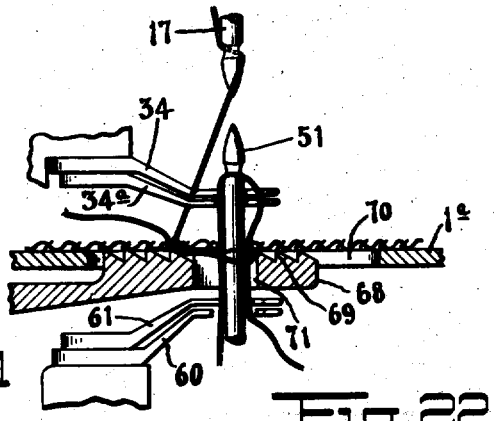
Figure 19 is a view showing the lower needle at the time it has completed its upward movement.
Figure 20:
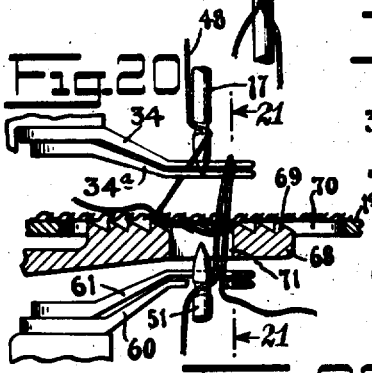
Figure 20 is a view showing the lower needle after it has started on its downward movement and the upper needle again descending.
Figure 21:
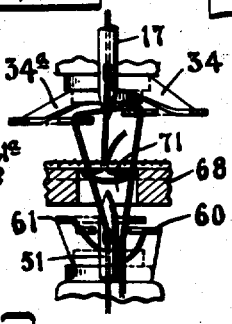
Figure 21 is a view taken on the line 21—21 of Figure 20 looking in the direction of the arrows.
Figure 22:
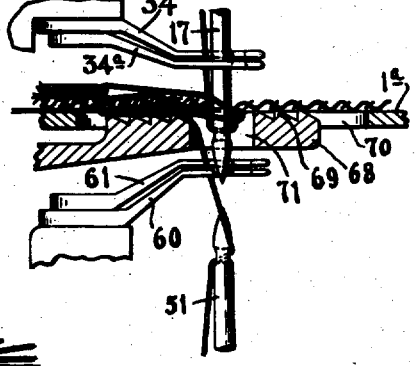
Figure 22 is a view showing the needles at the time when the lower needle has completed its downward movement.

As the lower needle continues upwardly it passes between the upper loop hooks 33 and 34 which at that time commence their opening movement so as to hold the loop of the thread of the lower neede in an extended spread condition. In Figure 19 there is indicated the position of the lower needle and the loop hooks at the instant when the lower needle starts its receding or downward movement and when the upper loop hooks start their opening movement. In Figure 20 the lower needle is indicated as it has receded below the needle plate and through the opening in the feeding claw with its looped thread held in a spread condition by the upper loop hooks (see Figure 21). In these last mentioned two figures the upper needle is also shown again starting its downward movement and about to pass through the spread loop held by the upper loop hooks. As the upper needle approaches the fabric on the needle plate, the mechanism of the machine which operates the feeding claw again functions and causes said feeding claw to advance the fabric so that the upper needle will pierce the fabric at an advanced point therein. In Figure 22 the upper needle is shown as having passed through the spread loop and carrying the same with it and the upper loop hooks are shown as partially closed. This figure also indicates the advanced fabric with several stitches produced therein by the action of the needles and loop hooks.

Figure 23:
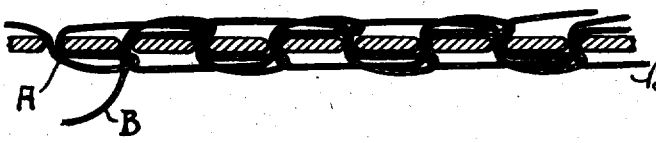
Figure 23 is an enlarged diagrammatic view indicating the manner in which the double chain stitch is formed by the reciprocating needles.

The type of double chain stitches formed by the operation of the needles and loop hooks as above described is indicated clearly in Figure 23. In said figure the upper thread is indicated by the letter A and the lower thread by the letter B.

It is to be understood that the reciprocating movements of the upper and lower needles are effected by their operating mechanisms so that said needles will operate in timed relation with each other and with the opening and closing of the loop hooks. Also the mechanisms for effecting the operation of the feeding claw is so constructed and arranged that said feeding claw will raise and lower from the fabric and feed the same along the needle plate in timed relation with the movements of the needles.

A double chain stitch sewing machine made in accordance with my invention has many advantages over usual types of machines which are capable of producing a double chain stitch. In the first place, the machine of the present invention eliminates the use of a bobbin and makes possible the provision of a less expensive and less complicated machine for producing a double chain stitch for joining fabrics. Secondly the rectilinearly alternately reciprocating needles operating in opposite directions provide a greater speed in sewing which is about twice as fast as in the case of the usual bobbin machines. Also the mechanism provided enables the feeding claw to feed the fabric along the needle plate twice as fast as such fabric can be fed in ordinary sewing machines. Furthermore, by utilizing a machine constructed and operating in the manner herein described it is possible to use smaller sizes of thread without danger of breaking because less strain is imposed thereon by reason of the short length of the loops produced by the sewing operations.

Having now set forth the nature of the invention, what I claim herein is:

1. In a sewing machine, the combination of a work supporting surface, means for feeding work along said supporting surface, thread carrying needles positioned to vertically project their thread through work on said work supporting surface and from either side thereof, means for alternately effecting the operations of said needles, expansible means for holding said thread projected through said work by said needles and for extending the same into a loop form until a new thread is projected therethrough by one of the needles on its thread projecting stroke, means for operating said expansible thread holding and loop extending means, and means for operating said work feeding means in timed relation to the thread projecting movements of said needles.

2. In a sewing machine, the combination of a work supporting plate, means for feeding work along said plate, means for effecting the operation of said work feeding means so that it will advance the work along said plate predetermined distances, thread carrying needles positioned to vertically project thread loops through the work and from opposite sides thereof, means for alternately operating said needles, expansible devices for holding and extending said loops of thread projected through the work by said needles until another loop of thread is projected through the same by one of the needles, means for effecting the expansion of said loop holding and extending means in timed relation to the loop projecting strokes of said needles, and means for regulating the length of feed of said work by said work feeding means.

3. In a sewing machine, the combination of a work supporting plate, means for feeding work along said plate, a presser foot positioned above said work plate and adapted to hold said work in feeding position on said plate, means for raising and lowering said presser foot into and out of operative position with respect to said work, thread carrying needles positioned so as to be adapted to vertically project thread loops through work on said work plate and from either side thereof, means for operating said needles in timed relation with each other so that they will alternately project their thread loops through the work, cooperating relatively separable members for receiving, holding and extending said loops of thread projected through said work by said needles until another loop of thread has been projected therethrough by one of said needles on another thread projecting stroke, means for effecting the relative separation of said loop extending members and in timed relation to the loop projecting strokes of said needles, and means for causing said work feeding means to feed the work along said work supporting plate at predetermined intervals.

4. In a sewing machine, the combination of a work supporting plate, means for feeding work along said work plate, means for causing said work feeding means to feed work along said plate at predetermined intervals and for predetermined distances, thread carrying needles positioned to vertically project thread loops through the work on said work plate and from either side thereof, operating means for said needles adapted to effect alternate operation thereof, means for effecting a uniform feeding of thread to said needles and at timed intervals, expansible devices for receiving, holding and extending the loops of thread projected through the work by said needles until another loop of thread has been projected therethrough by said needles, means for effecting the expansion of said loop holding and extending devices so that they will operate in timed relation to the loop projecting strokes of said needles and to the feeding movement of said work feeding means.

5. In a sewing machine, the combination of a work plate supporting surface, means for feeding work along said work plate, means for causing said work feeding means to feed work, along said work plate, predetermined distances, thread carrying needles positioned above and below said work plate, means for causing said needles to alternately and vertically project their thread through the work on said work plate, expansible devices for holding said thread projected through said work by said needles and to extend the same into a loop form until another thread from said needles has been projected therethrough, means for effecting the movements of said needles, the expansible loop extending devices and said work feeding means in timed relation to each other.

6. In a sewing machine, the combination of a work plate supporting surface, means for feeding work along said work plate, two vertically reciprocating thread carrying needles each positioned to project their threads through the work on said work plate and from opposite sides thereof, means for reciprocating said needles in timed relation to each other, expansible devices for extending the loops of thread projected through the work by each of said needles until the other needle projects a new loop of thread through said work and through said extended loop, means for expanding said loop extending devices in timed relation to the reciprocating movements of the needles, and means for operating said work feeding means to advance the work between needle strokes.

7. In a sewing machine, the combination of a work plate supporting surface, means for feeding work along said work plate, a pair of vertically reciprocating thread carrying needles one of which is positioned to project its thread through the work on said work plate from one side thereof and the other needle being positioned to project its thread through the work from the other side of said work plate, means for operating said needles so that their reciprocating movements will be in timed relation to each other, relatively movable hook devices for extending and holding the loops of thread projected through the work by each of said needles until the other needle projects a new loop of thread through the work and through said extended loop on its projecting stroke, means for operating said loop extending means in timed relation to the reciprocating movements of the needles, means for operating said work feeding means, to advance the work on said work plate, predetermined distances, between the strokes of said needles, and means for regulating the distance said work is advanced by said feeding means.

8. In a sewing machine, a work plate supporting surface, means positioned above the work plate for projecting loops of thread through the work on said plate, means positioned below the plate for projecting loops of thread through the work, means for actuating said thread loop projecting means alternately and in timed relation with each other, relatively movable hook members for extending and holding the loops projected through the work by the loop projecting means so that the alternately actuated loop projecting means will pass through the said loops on their loop projecting strokes and means to relatively move said hook members in timed relation with respect to said loop projecting means.

9. In a sewing machine, a work plate supporting surface, means positioned above the work plate for projecting loops of thread through the work on said plate, means positioned below the plate for projecting loops of thread through the work, means for actuating said thread loop projecting means alternately and in timed relation with each other, relatively separable members for extending and holding the loops projected through the work by the loop projecting means so that the alternately actuated loop projecting means will pass through the said loops on their loop projecting strokes, and means for relatively separating said loop extending members, and for feeding the work along the work plate in timed relation with the projecting movements of said needles.

10. In a sewing machine, the combination of a work plate supporting surface, a thread carrying needle positioned to operate from one side of the work, a second thread carrying needle positioned to operate from the other side of the work, means for actuating said needles in timed relation with each other to project loops of their thread through the work, a pair of loop hooks positioned above the work plate and in such manner that the said needles will pass therebetween when they are actuated, a pair of loop hooks positioned below the work plate and in such manner that the said needles will pass therebetween when they are actuated, means for actuating one pair of said loop hooks at time intervals so that said hooks will engage loops of thread projected through the work by one of said needles and cause said loops to be extended so that the other needle will pass therethrough as it projects its thread through the work, and means for actuating the other pair of loop hooks at timed intervals so that said hooks will engage loops of thread projected through the work by the other of said needles and extend the same so that the first mentioned needle will pass therethrough as it is actuated.

11. In a sewing machine, the combination of a work plate supporting surface, a thread carrying needle positioned to operate from one side of the work, a second thread carrying needle positioned to operate from the other side of the work, means for actuating said needles in timed relation with each other to project loops of their thread through the work, a pair of loop hooks positioned above the work plate and in such manner that the said needles will pass therebetween when they are actuated, a pair of loop hooks positioned below the work plate and in such manner that the said needles will pass therebetween when they are actuated, means for actuating one pair of said loop hooks at timed intervals so that said hooks will engage loops of thread projected through the work by one of said needles and cause said loops to be extended so that the other needle will pass therethrough as it projects its thread through the work, means for actuating the other pair of loop hooks at timed intervals so that said hooks will engage loops of thread projected through the work by the other of said needles and extend the same so that the first mentioned needle will pass therethrough as it is actuated, feeding means for advancing the work between needle strokes and means for effecting the operation of said feeding means in timed relation with the movements of said needles.

12. In a sewing machine, the combination of a work plate supporting surface, a thread carrying needle positioned to operate from one side of the work, a second thread carrying needle positioned to operate from the other side of the work, means for actuating said needles alternately with respect to each other to project loops of their thread through the work on said work plate, loop hooks positioned above the work plate, loop hooks positioned below the work plate, means for actuating the upper loop hooks in timed relation with the movements of the lower needle so that said hooks will engage the loops of thread projected through the work by said needle and hold said loops in an extended condition as the said needle withdraws below the work plate and so that the upper needle will pass therethrough, means for actuating the lower loop hooks in timed relation with the movements of the upper needle so that said hooks will engage the loops of thread projected through the work by said upper needle and hold said loops in an extended condition as the needle withdraws above the needle plate and so the lower needle will pass therethrough on its next upward thread projecting movement, and feeding means acting to advance the work between needle strokes in timed relation with the movements of said needles and loop hooks.

13. In a sewing machine, a work plate supporting surface, a thread carrying needle positioned to operate from one side of the work, a second thread carrying needle positioned to operate from the other side of the work, means actuated by the main drive shaft of the machine for operating said needles alternately and in timed relation with each other to project loops of their thread through the work, expansible devices positioned on either side of said work plate for grasping the loop of thread alternately projected through the work by said needles and to extend the same so that said needles on their next succeeding projecting stroke will pass therethrough, means for advancing the work along the work plate in timed relation with the movements of the needles and the loop extending devices and means actuated by the main drive shaft for effecting the operation of the work advancing means.

14. In a sewing machine, a work plate supporting surface, a thread carrying needle and driving connections actuating the same to project loops of threads through the work from one side thereof, a second thread carrying needle and driving connections actuating the same to project loops of said needle's thread through the work from the other side thereof, expansible loop spreading means and means to expand the same to engage loops of thread projected through the work by the first mentioned needle and to extend said loops of thread for the other needle to pass therethrough, a second expansible loop spreading means and means to expand the same to engage loops of thread projected through the work by the second mentioned needle for the first needle to pass therethrough, a presser device for holding the work on said work plate supporting surface, and means for advancing the work along the work plate and actuating means for effecting the operation of the work feeding means in timed relation to the movements of the thread carrying needles.

15. In a sewing machine, the combination of a work plate supporting surface, a thread carrying needle positioned above said work plate and adapted to have a vertical reciprocating movement through the work plate, a second thread carrying needle positioned below the work plate and adapted to have a vertical reciprocating movement through the work plate, means for imparting alternate reciprocating movements to said needles to cause them to project loops of their thread through the work on said work plate, relatively movable devices positioned above said work plate for grasping and spreading the loops of thread projected through the work by the lower needle, relatively movable devices positioned below said work plate for grasping and spreading the loops of thread projected through the work by the upper needle, means for effecting relative movement of each set of said loop spreading devices in timed relation with the reciprocating movement of said needles and so that loops of thread projected through the work by each of said needles will be held extended for the other needle to pass therethrough during its thread projecting stroke, and feeding means for advancing the work along said work plate and means for actuating the same between the strokes of said needles.

16. In a sewing machine, the combination of a work plate supporting surface, a thread carrying needle positioned above and below said work plate, means for alternately projecting said needles and their thread through the work plate, expansible loop spreading means for engaging the loops of thread projected through the work by said alternately operating needles so that the loops of thread projected through the work by one of said needles will be held extended for the other needle to pass therethrough during its next thread projecting stroke, means for effecting the expansion and contraction of said loop engaging means in timed relation to the operation of said needles, means for feeding thread to said needles at timed intervals, and means for advancing work along the work plate in timed relation to the projecting strokes of said needles.

17. In a sewing machine, in combination, a main drive shaft, a work plate supporting surfact, a reciprocating thread carrying needle positioned above said work plate and adapted to be reciprocated therethrough, a reciprocating thread carrying needle positioned below said work plate and adapted to be reciprocated therethrough, means on said main drive shaft for effecting the reciprocating movement of the upper thread carrying needle, means actuated by the main drive shaft for effecting the reciprocating movement of the lower thread carrying needle in alternate and timed relation to the reciprocating movement of the upper needle, a loop spreading means positioned above said work plate and in the path of the reciprocating movement of said needles, a loop spreading means positioned below said work plate and also in the path of the reciprocating movement of said needles, means on said main drive shaft for effecting the operation of said upper loop spreading means so that it will operate in timed relation with said needles to effect a spreading of the loops projected through the work by the lower needle and so said loops will be held extended for the upper needle to pass therethrough on its thread projecting strokes, means actuated by the main drive shaft for effecting the operation of the said lower loop spreading means so that it will operate in timed relation with said needles to effect a spreading of the loops projected through the work by the upper needle and to hold said loops extended for the lower needle to pass therethrough on its thread projecting strokes, feeding means for advancing the work along said work plate, and means driven by the main drive shaft for effecting the operation of the work feeding means in timed relation to the reciprocating movements of said needles, and means for regulating the length of feed of said work by said feeding means.

18. In a sewing machine, in combination, a main drive shaft, a work supporting plate, a vertically reciprocating thread carrying needle positioned above said work supporting plate and adapted to be reciprocated therethrough, a vertically reciprocating thread carrying needle positioned below said work supporting plate and adapted to be reciprocated therethrough, a cam member on said main drive shaft for effecting the reciprocating movement of the upper thread carrying needle, a similar cam member on another drive shaft for effecting reciprocating movement of the lower thread carrying needle alternately and in timed relation to the movements of the upper needle, means cooperating with the main drive shaft for effecting the movements of the second mentioned cam shaft, a pair of loop hooks positioned above said work plate and in the path of the reciprocating strokes of said needles, a pair of loop hooks positioned below said work plate and also positioned in the path of the reciprocating movement of said needles, means actuated by the cam member on the main drive shaft and means actuated by the cam member on the other mentioned drive shaft for effecting the operation of said upper and lower pairs of loop hooks in timed relation with the reciprocating movements of said needles so that they will operate to hold and spread the loops of thread projected through the work by said needles and maintain the same in a spread condition until the next projecting stroke of said needles projects a new loop therethrough, means operated by said cam members to tension and feed the thread to said needles at predetermined times, a presser foot device for yieldingly maintaining the work on said work supporting plate, means for lifting and lowering said presser foot device and the upper pair of loop hooks out of and into operating position with respect to the work supporting plate, means for feeding said work along said plate and operating means for said work feeding means to effect the movement thereof in timed relation to the reciprocating movements of said needles, and means for regulating the length of movement imparted to said work by said work feeding means.

19. In a sewing machine, in combination, a main drive shaft, a work supporting plate, means for feeding work along said plate, a vertically reciprocating needle positioned above said work supporting plate, and adapted to be reciprocated therethrough, a second vertically reciprocating needle positioned below said work plate and adapted to be reciprocated therethrough, a pair of loop hooks positioned above said work plate and adapted to engage loops projected through the work by the lower needle, a pair of loop hooks positioned below said work plate and adapted to engage loops projected through the work by the upper needle, a thread tension and feeding device for tensioning and feeding thread to the upper needle, a thread tensioning and feeding device for tensioning and feeding thread to the lower needle, a presser device for yieldingly maintaining said work on said work supporting plate, means secured to said main drive shaft and operating therewith for effecting the reciprocation of the upper needle and the opening and closing of said upper loop hooks, means driven by the main drive shaft for effecting the reciprocation of the lower needle and the opening and closing of the lower loop hooks, means for actuating the said operating means for the upper and lower needles and the upper and lower loop hooks in timed relation with each other so that said needles and hooks will effect the production of a series of running lock stitches through the work on said work plate, and means actuated by the main drive shaft for operating said work feeding means so that said work is advanced along said plate between the strokes of said needles predetermined distances.

20. In a sewing machine the combination of a work plate; feeding mechanism; sewing mechanism, including an upper and a lower thread carrying needle; upper and lower loop holding means, each disposed respectively and completely above and below the work plate; a rotatable main driving mechanism; and driving means, for operating said feeding mechanism twice, alternately projecting said upper needle and said lower needle each once into and out of the work on the plate, and operating said upper and lower loop holding means each once, upon each single rotation of the driving mechanism.

21. In a sewing machine the combination of a work plate; work feeding means; sewing mechanism, including upper and lower thread carrying needles each adapted to project a thread through the work on the plate from opposite sides thereof; upper and lower means for holding thread projected through the work by the needles and while the work feeding means operates for extending same into a loop form along the surfaces and line of feed until the other needle projects its thread therethrough; and driving means for alternately projecting the upper and lower needles through the loops and the work and alternately operating the lower and upper thread holding and loop extending means, and after each needle projection into and out of the work operating the work feeding means, to form a seam with alternate single and triple lengths of exposed thread on both sides of the work.

22. In a sewing machine, the combination of a work plate; work feeding means; means positioned above and below the work plate for projecting loops of thread through the work; means for holding thread projected downwardly through the work until a new thread loop is projected therethrough; a presser bar; means supported by said presser bar for holding said thread moved upwardly through the work by said projecting means until a new thread is projected therethrough; and driving means for operating the last named means, thread projecting means, thread holding means, and work feeding means concurrently.

23. In a sewing machine, the combination of a work plate; work feeding means; means positioned above and below the work plate for projecting loops of thread through the work; means for holding thread projected downwardly through the work until a new thread loop is projected therethrough; a presser bar; means supported by said presser bar for holding said thread moved upwardly through the work by said projected means until a new thread is projected therethrough; driving means for operating the last named means, thread projecting means, thread holding means, and work feeding means concurrently; and a connection permitting a rise and fall movement of said last named means with said presser rod to allow said thread holding means to be moved toward and from said work support.

24. In a sewing machine, the combination of a work plate; work feeding means; means positioned above the work plate for projecting loops of thread through the work on said plate; means positioned below the plate for projecting loops of thread through the work; means for actuating said thread loop projecting means alternately and in timed relation with each other; a pair of sleeves; a rod in each of said sleeves; a hook on each of said rods and said sleeves adapted to hold said thread moved through said work by said thread projecting means until a new thread is projected therethrough; and means for operating said thread projecting means, rods, sleeves, hooks and the work feeding means concurrently.

25. In a sewing machine, the combination of a work plate; feeding mechanism; sewing mechanism, including upper and lower needles each adapted to project thread loops through work on the plate from opposite sides thereof; upper loop holding means; lower loop holding means; driving mechanism; and means adapted to allow the upper lop holding means to be moved toward and from the work plate.

26. In a sewing machine, the combination of a work plate; work feeding means; means positioned above and below the work plate for projecting loops of thread through the work; a pair of sleeves; a rod in each of said sleeves; a hook on each of said rods and each of said sleeves adapted to hold and extend said thread in a loop form until a new thread is projected therethrough; driving means for operating said thread projecting means and said work feeding means concurrently; and a lazy tong mechanism in said driving means adapted to operate said rods and sleeves with the associated hooks in timed relation to the thread projecting means.

27. In a sewing machine, the combination of a work plate; means for projecting loops of thread through the work on said plate from opposite sides of the plate; means for actuating said thread loop projecting means; a pair of sleeves; a rod in each of said sleeves; a hook on each of said rods and said sleeves adapted to hold said thread moved through said work by said thread projecting means until a thread is projected therethrough; and means for operating said thread projecting means, rods, sleeves, and hooks concurrently.

28. In a sewing machine the combination of a work plate; means on opposite sides of the work plate adapted to form upwardly and downwardly pierced holes and to project alternate upwardly and downwardly extending loops of thread through said holes; means for feeding the work each time after said means forms each upwardly and each downwardly pierced hole; means for holding and laying such loops from the hole through which they are projected to the succeeding hole to be held by the thread projected through such succeeding hole; and means for operating said last named means, feeding means, and said piercing and thread projecting means each time one hole and one loop is formed concurrently.

BEULAH LOUISE HENRY.